United States Patent [19]

Mohn et al.

[11] Patent Number: 4,643,543

[45] Date of Patent: Feb. 17, 1987

[54] MIRROR OPTIC ARTICLE

[75] Inventors: Walter R. Mohn, Simpsonville; Peter A. Roth, Greenville, both of S.C.

[73] Assignee: Atlantic Richfield Company, Los Angeles, Calif.

[21] Appl. No.: 822,711

[22] Filed: Jan. 27, 1986

[51] Int. Cl.[4] .......................... G02B 1/00; G02B 5/08; G02B 7/18
[52] U.S. Cl. ...................................... 350/609; 350/607
[58] Field of Search ............... 350/609, 607, 600, 641; 428/698, 614, 627, 652, 687

[56] References Cited

U.S. PATENT DOCUMENTS 3,856,384 12/1974 Kryzhanousky .................... 350/609
4,451,119 5/1984 Meyers et al. ...................... 350/609

Primary Examiner—Jon W. Henry
Attorney, Agent, or Firm—Craig E. Larson

[57] ABSTRACT

This invention relates to an improved mirror optic article comprised of a continuous aluminum or aluminum alloy matrix having dispersed uniformly throughout particulate silicon carbide having an average particle diameter of 4 microns or less and having a reflective coating on at least one surface thereof.

6 Claims, 3 Drawing Figures

MIRROR OPTIC ARTICLE

BACKGROUND OF THE INVENTION

1. Field of the Invention

This invention relates to the field of mirror optics and more particularly to the provision of an improved metal optic article comprised of an isotropic substrate of aluminum or aluminum alloy having particulate silicon carbide uniformly dispersed throughout and an optical coating which preferably has substantially similar thermal expansion characteristics to the substrate.

2. The Prior Art

Advanced optical systems find wide applications in diverse areas ranging from the cryogenic environment found in space to the physically stressful conditions to which a combat tank is subjected, from high energy laser optics to stellar telescopes. In the design of such systems, careful consideration must be given to a number of factors including cost, desirability, stability, reflectance, and the like. See, for example, "Some Fundamentals of Metal Mirrors" by William Caithness, p. B-11, SPIE Vol. 65 (1975) Metal Optics, "Basic Properties of Metal Optics" by William B. Barnes, Jr. p. 320-323, OPtical Engineering, Vol. 16, No. 4, July-August 1977, "Selection of Materials and Processes for Metal Optics" by Roger A. Paquin, p. 12-19, SPIE Vol. 65 (1975) Metal Optics, and the like.

For many applications of mirror optics it is essential that the mirror exhibit an extremely high degree of dimensional stability even, for example, under conditions of repetitive thermal cycling at extreme temperatures.

Materials used in certain mirror optic devices have of necessity been extremely costly and in certain instances have been composed of materials such as beryllium which, in addition to being extremely costly, are also severely toxic and difficult to handle safely. Workers in the mirror optics field have long sought acceptable alternative materials for use in special applications where particular properties of stability and the like are essential.

It has been taught in the prior art that metals such as aluminum and alloys of aluminum can be strengthened and reinforced by incorporating in the aluminum or aluminum alloy particles or whiskers of non-metallic materials such as silicon carbide, boron nitride, carbon and the like. The resulting materials or composites comprise a continuous metal phase of matrix with the added particles distributed throughout.

U.S. Pat. No. 3,037,857 describes aluminum base alloys having refractory metal boride particles distributed throughout. U.S. Pat. No. 2,840,891 shows aluminum and alloys thereof having various finely divided particles distributed throughout including silicon carbide, various borides, oxides, titanates and the like.

An article entitled "Theoretical and Experimental Elastic Properties of Isotropic and Transversely Isotropic Silicon Carbide/Aluminum Composites" by Dennis Regis et al was presented January 1981 at the Third Silicon Carbide/Aluminum Technology Meeting in Boulder, Colo. and describes composites of silicon carbide in aluminum.

U.S. Pat. No. 3,421,862 describes incorporation of whiskers of various materials in aluminum alloy matrices. U.S. Pat. No. 3,728,108 also describes the preparation of composites of metal alloys containing filaments or particles as does U.S. Pat. No. 3,885,959. Fiber reinforced aluminum alloys are shown also in U.S. Pat. Nos. 4,452,865, 3,441,392, 4,060,412 and 4,463,058 while the preparation of whiskers such as those of silicon carbide are shown in U.S. Pat. Nos. 4,536,379, 4,534,948 and 3,758,672.

The use of fibers such as those of silicon carbide in glass-ceramic composite substrates to which mirror surfaces are bonded are described in U.S. Pat. No. 4,554,198.

SUMMARY OF THE INVENTION

The present invention relates to mirror optic articles of unusual stability suitable in such special applications as in star sensor optics and the like. Specifically, the invention relates to an improved mirror article comprised of a composite substrate which is a continuous aluminum or aluminum alloy matrix having dispersed uniformly throughout 15 to 45 volume percent of particles of silicon carbide, which particles have a mean particle diameter of 4 microns or less, the mirror article having a reflective coating bonded to at least one surface of the composite substrate.

THE DRAWINGS

DETAILED DESCRIPTION OF THE INVENTION

The improved article of the invention comprises a particulate, substantially isotropic composite substrate to which is bonded a relflective coating. The isotropic substrate, in turn, comprises aluminum or an aluminum alloy as the continuous matrix having uniformly dispersed throughout particles of silicon carbide.

It is an especially important feature of the invention that by proper selection of the quantity of silicon carbide particles which is incorporated in the composite, characteristics of the composite such as the coefficient of thermal expansion (herein CTE) can be closely matched to the corresponding characteristics of the reflective coating. In certain applications it is essential that properties of the substrate and of the reflective coating closely match in order that the finished optic article exhibit the necessary stability throughout an extended service life which involves extreme thermal excursions.

High purity aluminum or various of the known aluminum alloys can be used as the continuous matrix in formation of the composite substrate. Illustrative of appropriate aluminum alloys which can be used are those designated 6061, 2024, 2124, 7075, 5052, and the like. The compositions of these alloys are well known and are, for example, published in "Aluminum Standards and Data" by the Aluminum Association, Inc., 818 Connecticut Ave. N.W., Washington, D.C. 20006, in U.S. Pat. No. 4,336,075, and the like. In preferred practice the aluminum or alloy thereof is used as a finely divided powder, e.g., of minus 200 mesh or less, preferably minus 325 mesh. Such powders are commercially available materials.

In preparation of the composite substrate, the aluminum or aluminum powder is combined with particulate silicon carbide in amounts such that the silicon carbide particles comprise 15 to 45 volume percent of the resulting mixture, and more preferably 25 to 40 volume percent of the mixture.

Figure 1:
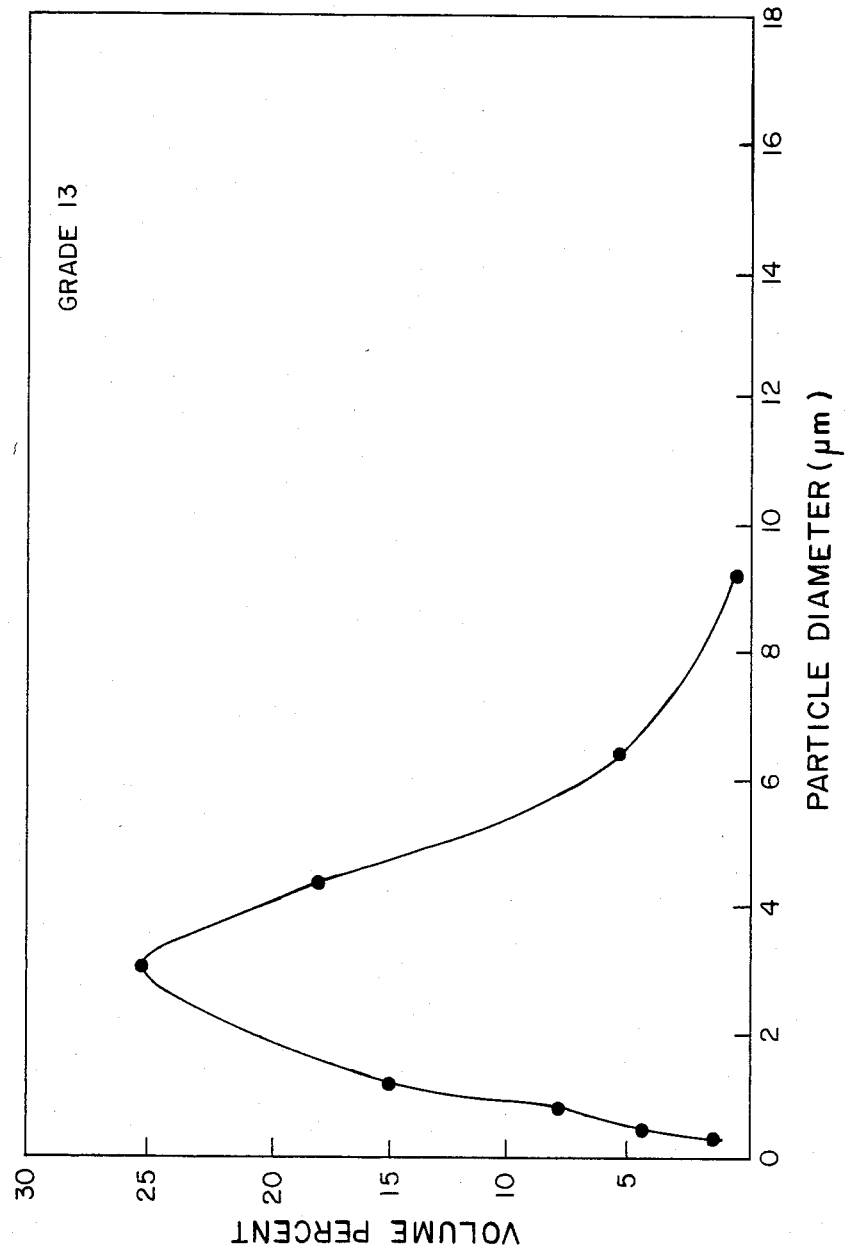
FIG. 1 illustrates the size distribution of a representative grade of silicon carbide particles which can be used in the invention.

Essential to practice of the invention is the use of particulate silicon carbide having an average particle diameter of 4 microns or less and having a particle size distribution such that essentially all of the particles have a particle diameter less than 10 microns. FIG. 1, for example, shows the size distribution of a particulate silicon carbide suitably used in preparation of the articles of the invention. Other suitable grades of silicon carbide particulate which are available illustratively have average diameters of 1.5 and 1.0 microns.

By way of contrast, when the composite substrates of the invention are compared to those formed using larger sized silicon carbide particles or to those formed using silicon carbide "whiskers" it will be seen that the composites prepared according to the invention are significantly more stable. Indeed, the composite substrates used in the invention have been shown to be more stable even than costly and toxic beryllium which has found wide application in the mirror optic art.

By particulate silicon carbide as used in this invention is meant the particles which result from crusihing and grinding commercially produced large size bodies of silicon carbide. The particulate silicon carbide is of a generally irregular shape with aspect ratios approaching unity as contrasted with the elongated shapes of monocrystalline "whiskers" (with aspect ratios usually greater than 10) which are formed, for example, from rice hulls by pyrolysis.

Polycrystalline silicon carbide is produced commercially by electrochemical reaction of high grade silica sand and carbon (coke) in an electric resistance furnace. See, for example, Kirk-Othmer "Encyclopedia of Chemical Technology" 3rd Edition, Vol. 4, p. 535–535 (1978). By appropriate crushing, grinding and screening particulate silicon carbide suitable for use in the invention is readily obtained. Illustrative of particulate silicon carbide which can be employed is the commercially available 1500 grit grade.

While not intending to be bound by theory, it is believed that the superiority of the composites used in this invention, which have a uniform dispersion of fine silicon carbide particles as compared to similar composites which contain silicon carbide whiskers, or larger particulates, is due at least in part to the greater number of sites for atomic structural dislocation pile-ups. Also the clean and sharp cleavage planes, characteristic if the surfaces of the small silicon carbide particles used in this invention may control the quality of reinforcement-matrix bonding, thereby enhancing the stability of the final composite.

The aluminum alloy matrix powder is combined with the silicon carbide particles and formed into a composite by generally known methods. It is essential that the particles be uniformly distributed as the discontinuous phase throughout continuous metal matrix phase. Procedures for forming the composite generally involve the thorough admixing of powdered metal and the silicon carbide particles followed by the application of heat and pressure to consolidate the powder composite blend composition into a dense form.

The composite substrate is generally produced in the form of a billet which can be forged or otherwise formed into the desired configuration. It is generally advantageous to heat treat the composite in accordance with known techniques to enhance the properties of the composite substrate. Such known procedures include the T-6 treatment which involves heating to an appropriate temperature where all alloying constituents are in solution, quenching in water, artificial aging to permit slow diffusion and precipitation of the alloy components, and finally air cooling.

The optical coating is applied to the substrate by procedures conventionally employed in the mirror art. A particularly perferred mirror optic article of the invention is that formed by providing an electroless nickel coating on the aluminum or aluminum alloy and particulate silicon carbide composite substrate. A comprehensive description of the electroless nickel coating technology can be found in "Electroless Nickel: Alternative to Chromium Coatings" by Ronald N. Duncan, Metal Progess June 1985 p. 31–36. In addition, any of the known procedures for application of an optical coating can be used including spraying, vapor deposition, cathode sputtering, and the like.

In addition to electroless nickel, other reflective and protective optical coatings may include chromium, a chromium-gold alloy which is especially useful in laser reflecting applications, silicon monoxide, and the like.

An outstanding feature of the mirror optic articles of this invention is their extreme stability, especially after prolonged thermal cycling.

EXAMPLES

Composite substrates were prepared in accordance with the invention using 1500 grit silicon carbide particulate having the particle size and distribution shown in FIG. 1. The mean particle diameter was less than 3.8 microns, the BET surface area was greater than 5 square meters per gram, silica content was 1.0% maximum and free carbon content was 0.5% maximum.

The particulate silicon carbide was blended with minus 325 mesh 2124 powdered aluminum alloy to form blends containing 30 and 40 volume percent particulate.

Billets were prepared from the blends by vacuum hot pressing procedures and were found to be fully dense, isotropic, and homogeneous. After heat treating to the T-6 condition the composite substrates had the characteristics shown in the following Table 1 with characteristics of beryllium and 2024 aluminum alloy also shown for comparison.

TABLE 1

| | PROPERTIES COMPARISON | | | |
|---|---|---|---|---|
| Property | 30% SiC Composite | 40% SiC Composite | Beryllium 1-220 | 2024 Al Alloy |
| Microyield Strength** (psi) | 17,000 | — | 5,000 | — |
| CTE ($10^{-6}$ in/in/°F.) | 6.9 | 6.0 | 6.4 | 12.9 |
| Modulus ($10^6$ psi) | 17 | 21 | 44 | 10.5 |
| Density (lb/in$^3$) | 0.105 | 0.107 | 0.067 | 0.100 |
| Specific Modulus ($10^6$ in) | 162 | 196 | 657 | 105 |
| Thermal Conductivity (BTU/hr-ft-°F.) | 72 | 67 | 104 | 87 |
| Specific Heat (BTU/lb/°F.) | 0.19 | 0.16 | 0.47 | 0.22 |

**Microyield strength (MYS) is the stress required to cause one microinch of residual (plastic) strain.

Figure 2:
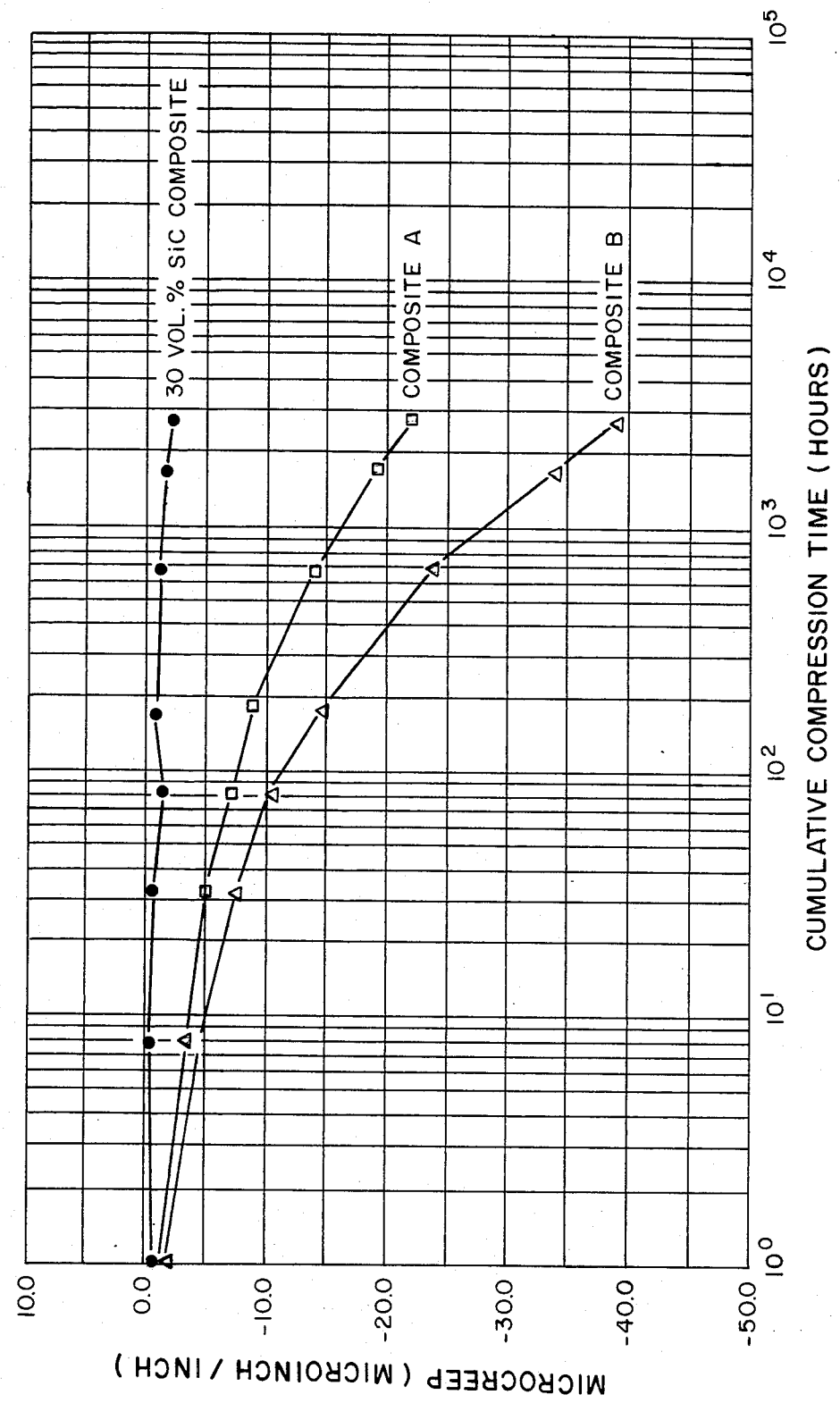
FIGS. 2 and 3 show microcreep stability.
Figure 3:
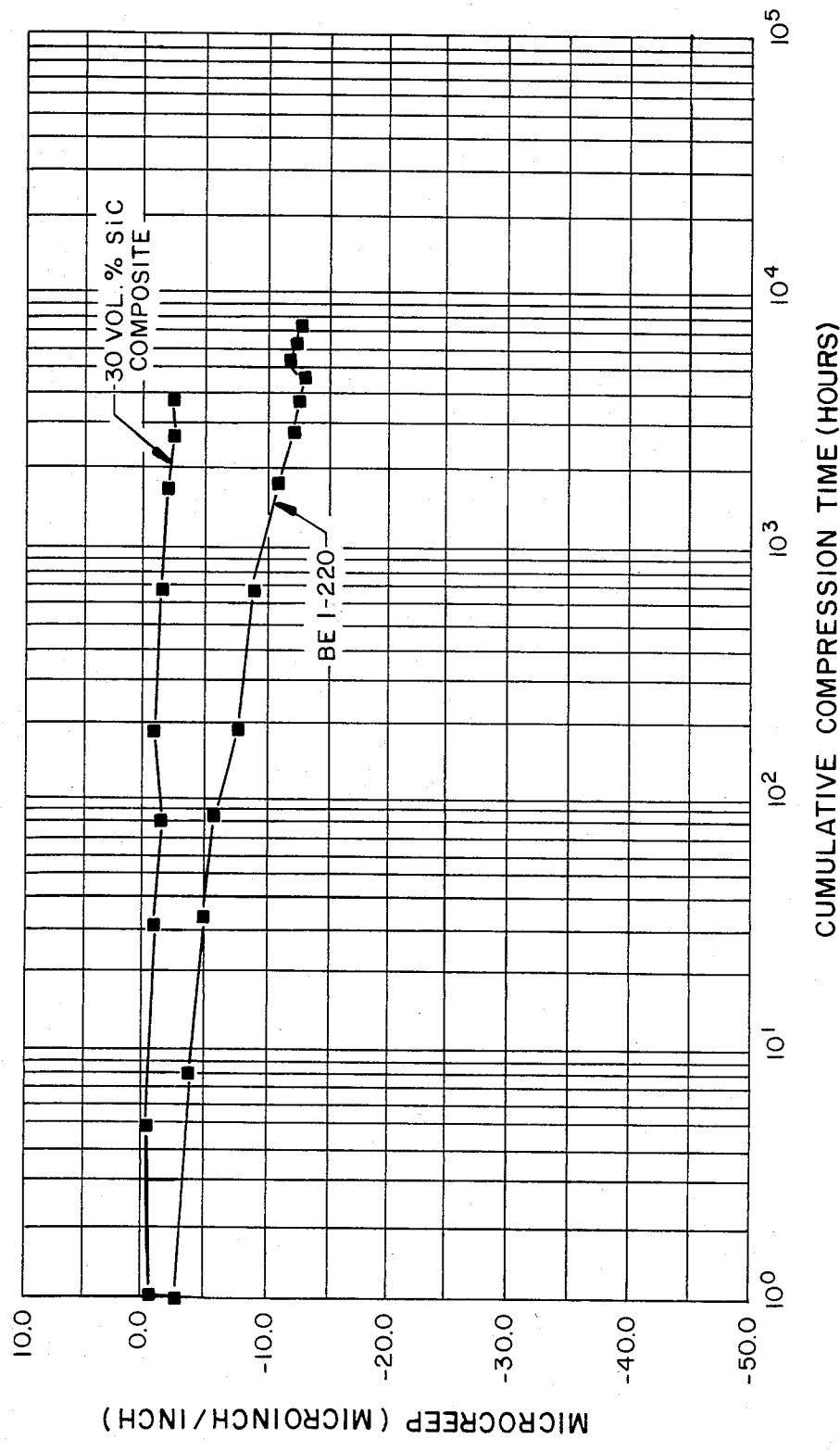

The microcreep stability of the 30 volume percent silicon carbide composite substrate was determined at 6445 psi compression stress and is compared in FIG. 3 with that of beryllium and in FIG. 2 with that of different silicon carbide composites which are not in accordance with the invention. In FIG. 2, Composite A was prepared in a similar fashion with the same 2124 aluminum alloy but with 30 volume percent of particulate silicon carbide which had an average particle diameter of 10 microns and Composite B was prepared in a similar fashion with the 2124 aluminum alloy but with 10 volume percent of the same particulate silicon carbide used in the 30 volume percent composite of the invention, 15 volume percent of the particulate silicon carbide used in Composite A, and 5 volume percent monocrystalline silicon carbide whiskers.

As can be seen from the above, the composites prepared in accordance with the invention have superior stability both as compared to beryllium and to similar composites not according to the invention. For aluminum or a particulate aluminum alloy which may have been subjected to heat treatment in accordance with known procedures, important properties such as CTE can be controlled with precision within significantly (contour maps) of the surface as viewed in a laser illuminated Fabry-Perot cavity and (2) resolution of bar patterns as seen in autocollimation with a three-inch Davidson D656-102 autocollimator. Test results, based on fringe patterns, showed 1/10 wave flatness after 320 thermal cycles with no evidence of change throughout the test sequence. The autocollimator showed better than 3.4 seconds of arc resolution. Other tests of larger, six-inch diameter mirrors were conducted at cryogenic temperatures. Flatness of these mirrors, cooled and measured in vacuum at $-320°$ F., was maintained to within $1\frac{1}{2}$ fringes.

It should be noted that the CTE of the electroless nickel coating is 6.7 as compared to 6.9 for the substrate, thus insuring the stability between substrate and coating over wide ranges of temperatures.

A general comparison of the characteristics of the composite substrates used in the present invention with those of other substrates is presented in the following Table 2.

TABLE 2

| | COMPARISON OF MIRROR SUBSTRATE MATERIALS | | | | | |
|---|---|---|---|---|---|---|
| Property | 30 Vol. % SiC Composite | 40 Vol. % SiC Composite | Beryllium 1-70 | Glass | Beryllium Copper (25) | 6061-T6 Aluminum |
| Modulus ($10^6$ psi) | 17 | 21 | 44 | 6–10 | 19 | 10 |
| Density (lb/in$^3$) | 0.105 | 0.107 | 0.067 | 0.08–0.1 | 0.302 | 0.098 |
| CTE (in/in/°F.) | 6.9 | 6.0 | 6.2 | 0.017 | 9.7 | 12.5 |
| Microyield Strength (psi) | 17,000 | not tested | 2,500 | UTS | — | 18,000 |
| Thermal Conductivity $\left(\frac{BTU}{hr\text{-}ft\text{-}°F.}\right)$ | 72 | 67 | 127 | 0.8–1.0 | 60 | 99 |
| Characteristic | | | | | | |
| Ease of Direct Diamond Turning | Difficult; only to prep. surface for CVD coating | Difficult; only to prep. surface for CVD coating | Very Poor | Very Poor | Good | Good |
| Ease of Direct Polishing | N/A; must be plated | N/A; must be plated | Difficult | Good | Good | Difficult |
| Ease of Electroless Nickel plating | Good | Good | Good | N/A | Good | Good |
| Relative Cost | Moderate | Moderate | High | Low | Low | Low | wide limits by controlling the silicon carbide content. In this way it is possible to provide a composite substrate containing 15 to 45 volume percent silicon carbide having a CTE closely matching that of an optical coating for CTE's ranging from about 5.2 to 9.5 ($10^{-6}$ in/in/° F.), the lower CTE's corresponding to the higher percentages of silicon carbide, and vice versa. CTE's of substrate and optical coating within about 0.5 )$10^{-6}$/in/° F.) of each other are preferred in the optic articles of the invention.

A 2 inch diameter flat mirror was fabricated from the 30 volume percent silicon carbide composite substrate by coating the entire substrate with a reflective layer of electroless nickel. The article was then polished to form the optic article and thin protective layers of aluminum and silicon monoxide were applied. The mirror was tested for thermal cycling stability to determine the potential of the mirror for use in star sensor optics. Each cyclic exposure of the mirror involved cooling from room temperature at 2.4° F. per minute to −40° F., holding for 20 minutes, followed by heating at 12.7° F. per minute to 150° F. After cycling, two tests were applied at room temperature (68° F.); (1) interferograms

I claim:
1. A mirror optic article comprised of an aluminum or aluminum alloy matrix substrate having uniformly dispersed throughout about 15 to about 45 volume percent of particulate silicon carbide having an average particle diameter of about 4 microns or less, and a reflective coating on at least one surface of said substrate.
2. The article of claim 1 wherein the substrate contains 25 to 40 volume percent of said particulate silicon carbide.
3. The article of claim 1 wherein said reflective coating is an electroless nickel coating.
4. The article of claim 1 wherein the CTE of the said substrate is substantially the same as that of said coating.
5. A mirror optic article comprised of an aluminum or aluminum alloy matrix substrate having uniformly dispersed throughout about 25 to about 40 volume percent of particulate silicon carbide having an average particle diameter of about 3.8 microns and a reflective coating on at least one surface of said substrate.
6. The article of claim 5 wherein the reflective coating is an electroless nickel coating.

* * * * *

UNITED STATES PATENT AND TRADEMARK OFFICE

Certificate

Patent No. 4,643,543　　　　　　　　　　　　　　　　　　　Patented: Feb. 17, 1987

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is:

Walter R. Mohn, Peter A. Roth and Jacob D. Gubbay

Signed and Sealed this Fourteenth Day of November, 1989

JON W. HENRY

*Senior Examiner*
*Art Unit 257*